(12) United States Patent
Vait

(10) Patent No.: US 7,305,730 B1
(45) Date of Patent: Dec. 11, 2007

(54) FREIGHT LOADING BUMPER

(76) Inventor: Tom J. Vait, 205 Teakwood La., Lewisville, TX (US) 75067

(\*) Notice: Subject to any disclaimer, the term of this patent is extended or adjusted under 35 U.S.C. 154(b) by 0 days.

(21) Appl. No.: 11/511,120

(22) Filed: Aug. 28, 2006

(51) Int. Cl.
*E01D 1/00* (2006.01)
(52) U.S. Cl. .......................................... 14/69.5; 14/71.1
(58) Field of Classification Search ................. 14/69.5, 14/71.1
See application file for complete search history.

(56) References Cited

U.S. PATENT DOCUMENTS

| | | | |
|---|---|---|---|
| 3,933,111 A | 1/1976 | von Bose et al. | |
| 4,689,846 A * | 9/1987 | Sherrod | 14/71.3 |
| D377,775 S | 2/1997 | Barton, Jr. | |
| 5,657,716 A * | 8/1997 | Beasley | 116/303 |
| 6,006,389 A | 12/1999 | Alexander | |
| 6,070,283 A | 6/2000 | Hahn | |
| 6,739,011 B1 * | 5/2004 | Brouillette | 14/71.1 |
| 6,764,116 B2 | 7/2004 | Ledford et al. | |
| 6,832,403 B2 | 12/2004 | Hahn et al. | |

\* cited by examiner

*Primary Examiner*—Raymond W Addie
(74) *Attorney, Agent, or Firm*—Lawrence J. Gibney, Jr.

(57) ABSTRACT

This is a bumper system which protects the area of the dock on a warehouse from unnecessary damage by trailers, forklifts and the like. The devices will be secured to the front of a loading dock and will have a rubber bumper to absorb the shock. The device is hinged to allow rotation for necessary repair and maintenance.

5 Claims, 5 Drawing Sheets

FREIGHT LOADING BUMPER

BACKGROUND OF THE INVENTION

A. Field of the Invention

This relates to loading docks or freight loading docks in which cargo or material must be transported from a truck or trailer to a warehouse or other facility. This device will protect the dock area as well as protect the trailer from unnecessary and unneeded damage during the unloading process.

B. Prior Art

There are other references to loading docks with adjustable bumpers. An example of the prior art can be found at Von Bose U.S. Pat. No. 3,933,111. Another example of an adjustable safety bumper is Ledford, U.S. Pat. No. 6,764,116. This is an adjustable safety bumper.

The device which is described in the current application protects the dock area by employing a bumper system on a loading dock. None of the bumpers in the prior art are similar to the structure that is in use for this particular application.

BRIEF SUMMARY OF THE INVENTION

Bumpers by their very nature are designed to absorb impact. This is to prevent damage to a particular area or a particular item and are commonly used to protect the item from damage.

The current application is attached to the top of the loading dock in a warehouse. In operation the device remains flashing with the loading dock. The bumper area would extend outward from the front of the dock a predetermined distance. A series of holes for the bumper material would be used to attach the bumper material.

The device will be hinged so that the bumper can be rotated approximately two hundred and seventy degrees, if desired.

A series of plates provide strength to the sides as well as the top of the device. Additionally, on the top surface pipes are welded to a vertical hinge plate, which provides additional strength.

It is an object of this device to have an item, which will protect the area of a loading dock but also be allowed to rotate to expose the dock area, if desired.

DETAILED DESCRIPTION OF THE EMBODIMENT

Figure 1:
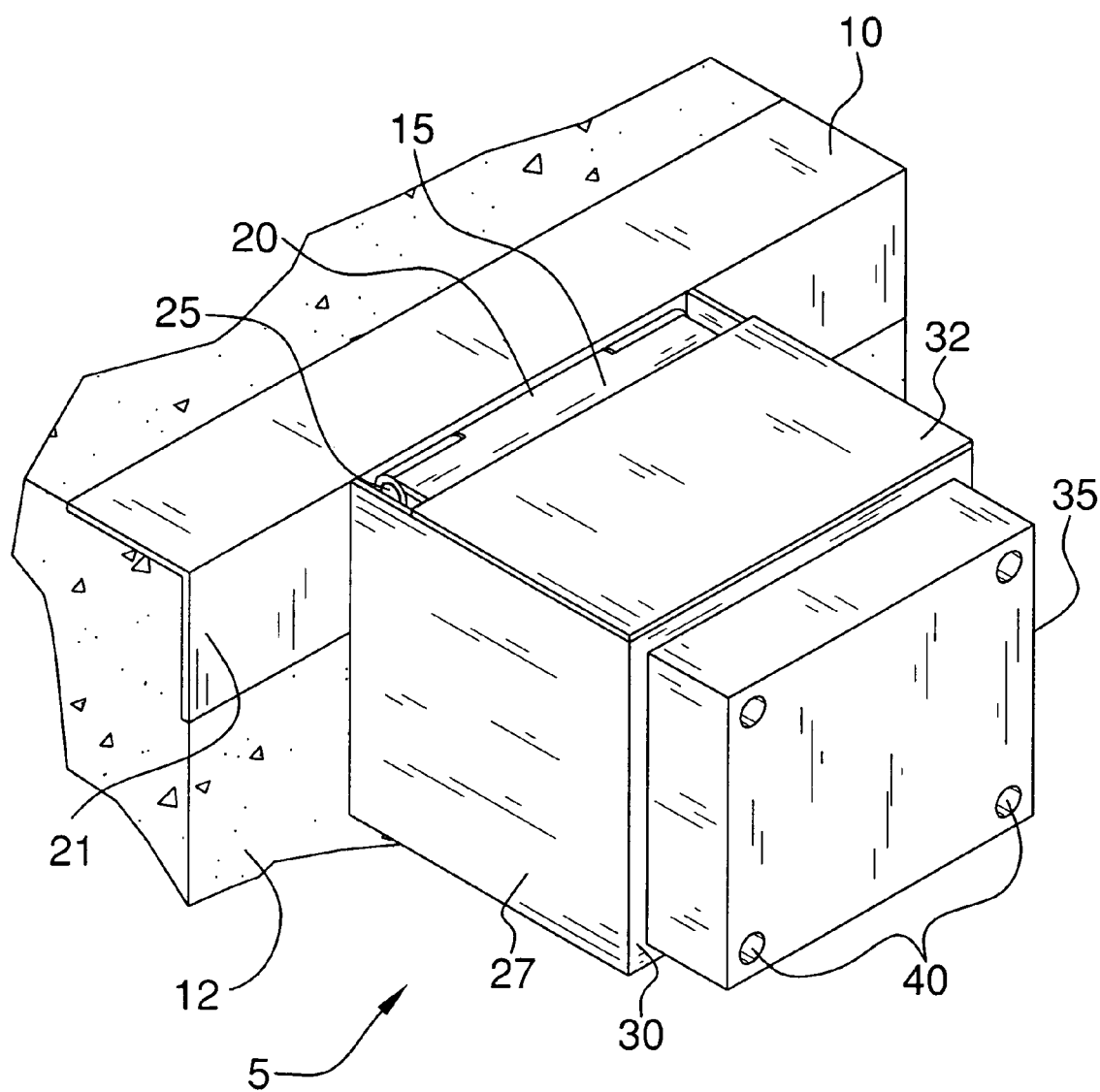
FIG. 1 is an isometric view of the device installed on a loading dock.

This device 5 will be installed on the front 12 of a loading dock 12. It will rest so that a pre-determined area of the device will rest on the front of the dock 12 and extend outward from the loading dock. FIG. 1

It will extend a pre-determined distance from the dock 12 and have a pre-determined shape. The first end will be comprised of a vertical hinge plate 21 and a loading dock plate 10 which are secured to the loading dock 12 and a second end, which has a bumper surface 35 that will extend outward from the loading dock. A loading dock plate 10 also is employed to secure the device to the top of the loading dock. FIG. 1

Figure 3:
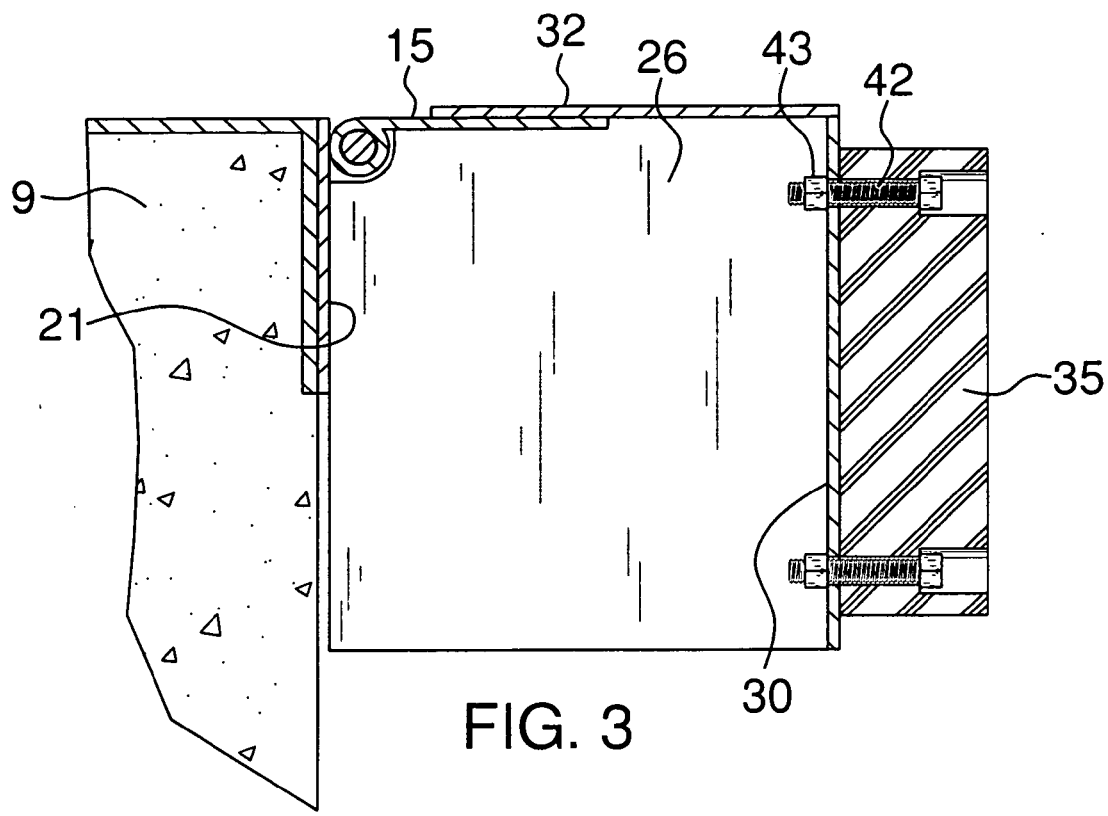
FIG. 3 is a cross sectional side view of the device installed on a dock.
Figure 7:
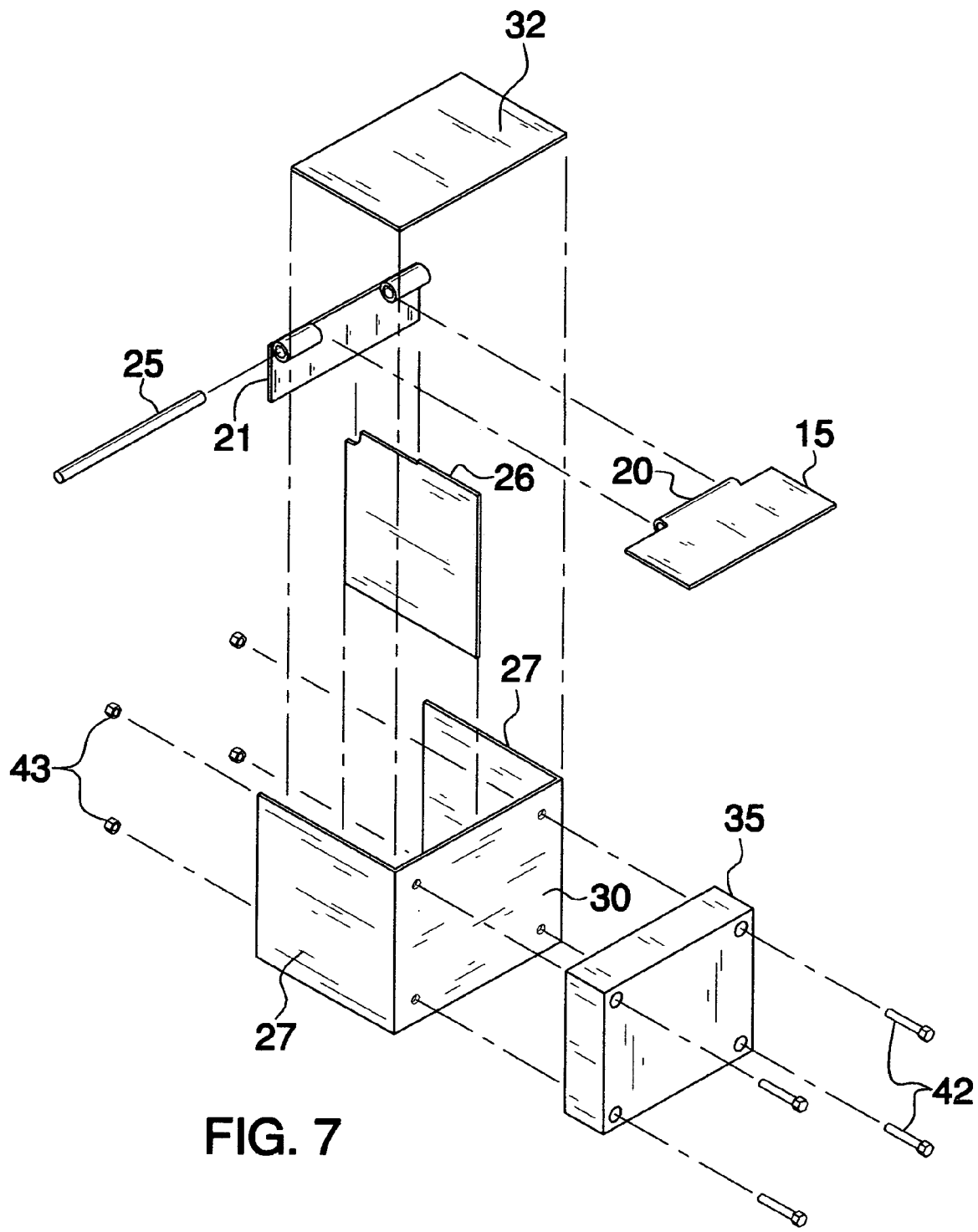
FIG. 7 is an exploded view of the device.

The bumper surface 35 will be mounted to a front plate 30 through a series of mounting holes 40 for the bumper 35 on the front plate 30. It is anticipated that the means of attachment for the bumper 35 will be a bolt 42 and nut 43 combination. FIGS. 3, 7 The purpose of securing the bumper 35 to the front plate 30 will be to absorb the impact from any direct blows to the bumper 35. FIG. 3 The bumper 35 may be constructed from a variety of material including, but not limited to, rubber and hard plastic. The choice of material that is selected should be able to withstand a great deal of force or impact.

Figure 2:
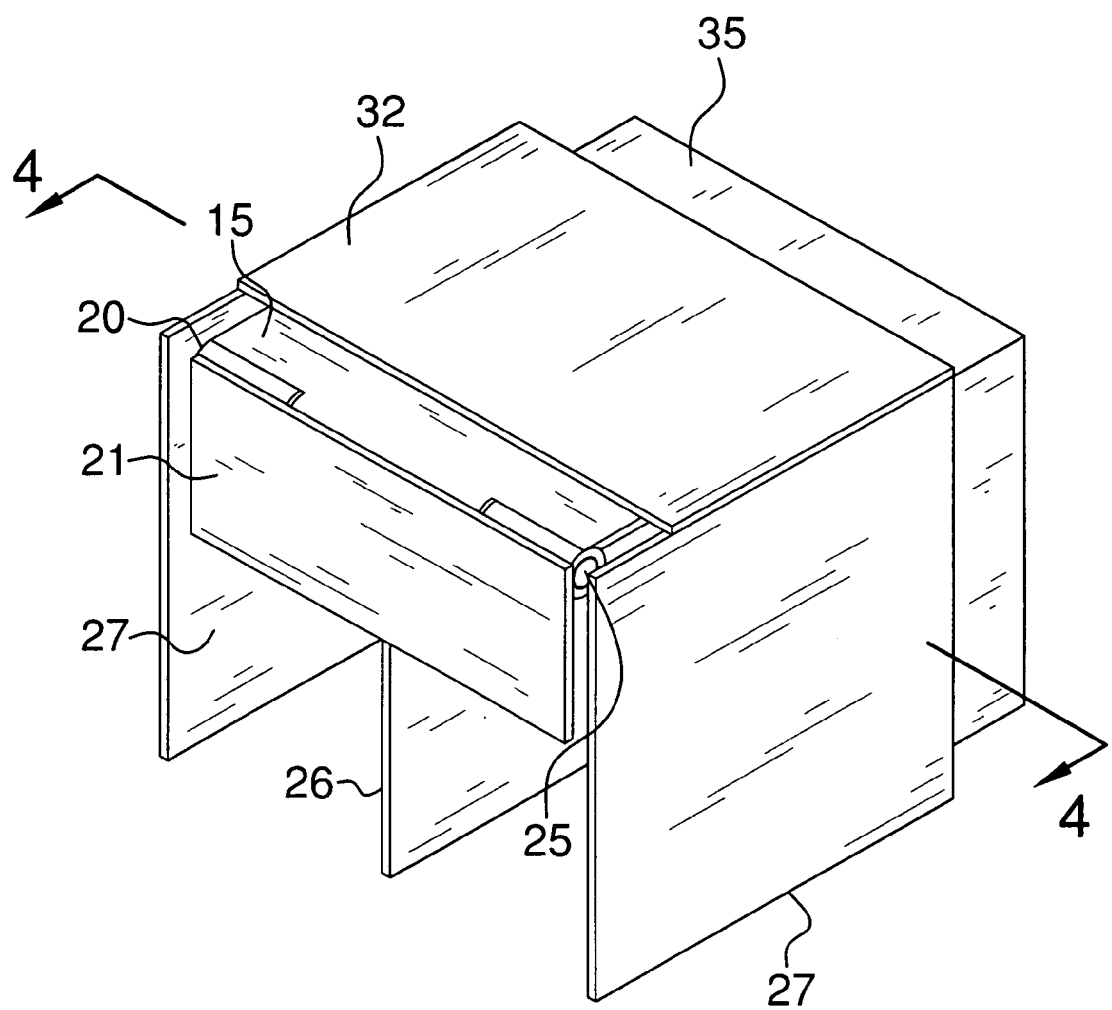
FIG. 2 is an isometric view of the device form the rear without showing the dock.

A hinge 20 with a hinge pin 25 will be positioned on the first end of the device, which is secured to the front of the loading dock 12. FIG. 2 The hinge 20 will be installed as part of a horizontal hinge plate 15 and a vertical hinge plate 21. FIGS. 1,2,5,7 The vertical hinge plate 21 is mounted to the loading dock 12 probably by welding, although an anchoring system may also be employed to give the device 5 additional strength. FIG. 3 An opening is provided in the hinge plate is provided to insert a hinge pin 25 and secure the vertical hinge plate 21 to the horizontal hinge plate 15. An opening on the hinge 20 provides the means of connection.

Figure 5:
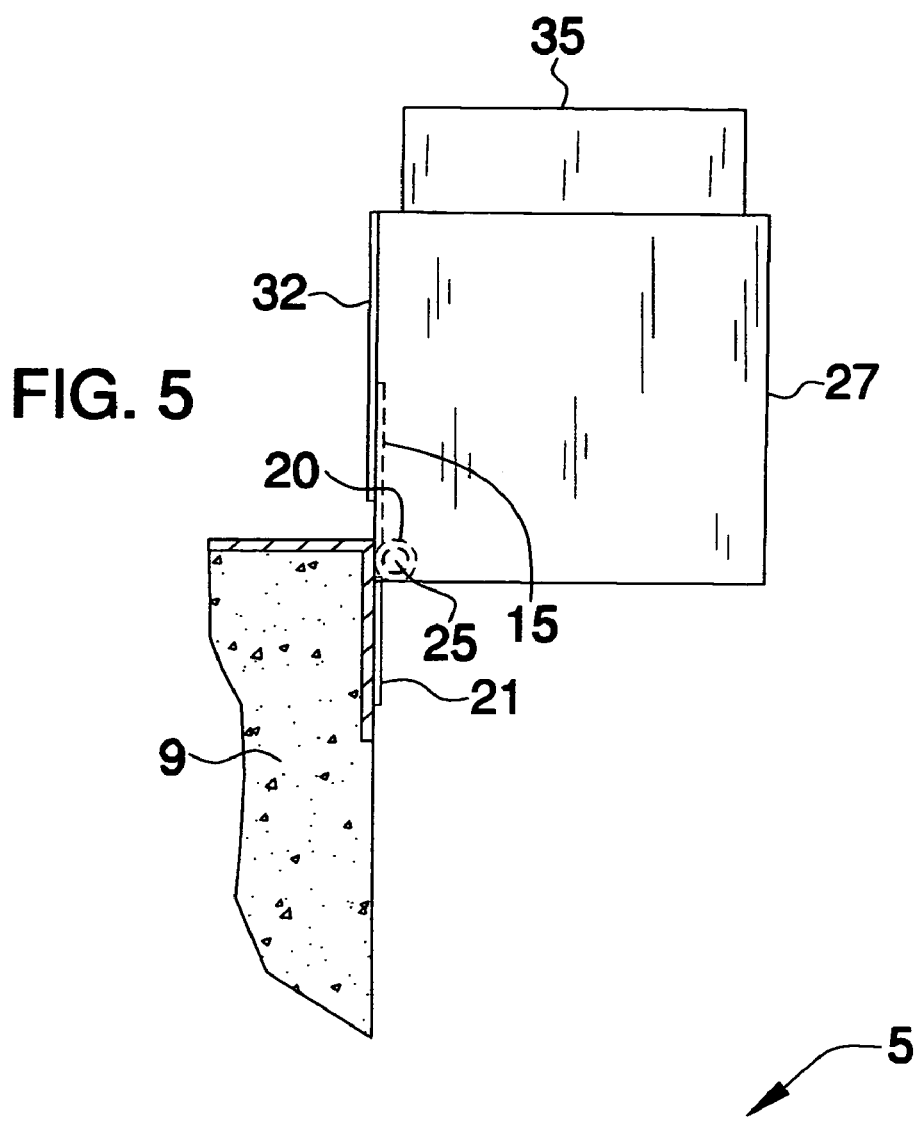
FIG. 5 is a side view of the device rotated approximately ninety degrees.
Figure 6:
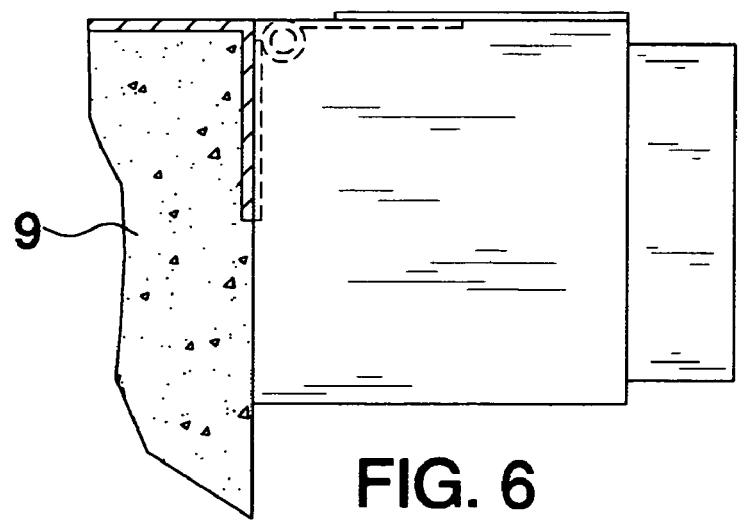
FIG. 6 is a side view of the device in place.

The vertical hinge plate 21 is welded to the front of the dock 12 and the use of the hinge 20 and hinge pin 25 will allow the device to rotate upwards as depicted in FIG. 5; the vertical hinge plate 21 and the loading dock plate 10 form one structure. FIG. 3

Figure 4:
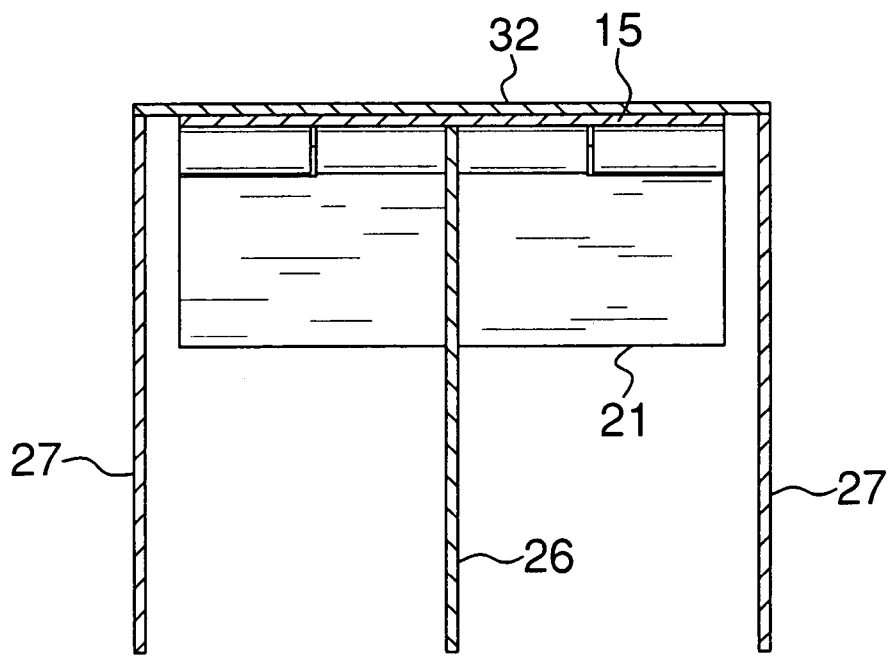
FIG. 4 is a view according to line 4-4 on FIG. 2.

On the top surface will be the horizontal hinge plate 15, which is inserted underneath and secured to a top closure plate 32 and the respective side plates 27. The front plate 30 is formed as part of the top closure plate 32. FIGS. 3,7 The top closure plate 32 will most likely be attached to the horizontal hinge plate 15 and side plates 27 by welding. In the middle of the device will be a middle gusset plate 26. The middle gusset plate 26 is necessary in order to provide strength to the device and will probably be secured to the underside of the top closure 32 plate by welding. Side plates 27 are installed to form the structure of the device. FIG. 4, 7

It is anticipated that because this device is in a freight loading or docking system that it will subjected to extreme loads and strength considerations are paramount. The choice of material for the plates and hinge mechanism is likely to be steel.

The invention claimed is:

1. A freight bumper system, comprising:
   a front plate, having an outer surface and an inner surface, and a plurality of holes, extending therethrough;
   a bumper mounted to the front plate;
   a plurality of side plates connected to the front plate;
   a gusset plate disposed approximately center of said side plates;
   a top closure plate integral with said front plate;
   means to secure said bumper system to a loading dock; said means to secure comprising a vertical hinge plate and a loading dock plate;
   a horizontal hinge plate secured to said vertical hinge plate, via a hinge pin;
   hinge pin securing means
   wherein, said horizontal hinge plate is secured to said top closure plate, and the top closure plate is secured to said side plates.

2. The freight bumper system of claim 1, wherein means to secure the bumper system is a plurality of nuts and blots.

3. The freight bumper system of claim 1, wherein the plates comprise steel plates.

4. The freight bumper system of claim 1, wherein the means to secure the bumper system to the loading dock comprises welding.

5. The freight bumper system of claim 1 wherein the means to secure the bumper system to the loading dock comprises an anchoring system.

\* \* \* \* \*